United States Patent [19]

Niles et al.

[11] 4,129,034

[45] Dec. 12, 1978

[54] METHOD AND APPARATUS FOR CHECKING ENGINE PERFORMANCE

[75] Inventors: Albert B. Niles, Chillicothe; Larry H. Franzen, Peoria; William J. Gardner, Pekin; Russel W. Grob, Metamora, all of Ill.

[73] Assignee: Caterpillar Tractor Co., Peoria, Ill.

[21] Appl. No.: 135,300

[22] Filed: Apr. 19, 1971

[51] Int. Cl.² .......................................... G01M 15/00
[52] U.S. Cl. ................................. 73/117.3; 364/442
[58] Field of Search ................. 73/117, 113, 114, 116, 73/707, 119 A, 117.3; 235/150.51, 150.52, 151.34, 61 J

[56] References Cited
U.S. PATENT DOCUMENTS

| | | | |
|---|---|---|---|
| 2,685,198 | 8/1954 | Saul, Sr. | 73/113 |
| 3,118,302 | 1/1964 | Fathauer | 73/114 |
| 3,347,092 | 10/1967 | Stutson | 73/114 |
| 3,722,265 | 3/1973 | Metz et al. | 73/117.3 |

*Primary Examiner*—Jerry W. Myracle
*Attorney, Agent, or Firm*—Phillips, Moore, Weissenberger, Lempio & Majestic

[57] ABSTRACT

Brake horsepower of an internal combustion engine is determined rapidly and without necessarily removing the engine from a vehicle or other work installation and without requiring a complex test installation such as a dynamometer. It has been found that the power output of an engine at a specific engine speed and constant load, is a function of the rate of fuel consumption by the engine provided that certain readily detectable engine malfunctions are absent. A compact instrument, preferably using digital circuits to provide a horsepower readout, is coupled to the engine through a digitizing flow meter disposed in the engine fuel line and through a digitizing tachometer coupled to a rotating element of the engine, the instrument also having means connected to the engine to assure that readings are taken only under substantially constant load conditions.

2 Claims, 5 Drawing Figures

INVENTORS
ALBERT B. NILES
LARRY H. FRANZEN
WILLIAM J. GARDNER
RUSSEL W. GROB

BY Fryer, Tjensvold, Feix, Phillips & Lempio
ATTORNEYS

METHOD AND APPARATUS FOR CHECKING ENGINE PERFORMANCE

BACKGROUND OF THE INVENTION

This invention relates to instrumentation and techniques for checking the performance of internal combustion engines.

Although power output, customarily measured in terms of brake horsepower, is a parameter of primary importance in evaluating engine performance, no really convenient means for testing this aspect of engine operation in the field is presently available. Engine stand dynamometers are utilized for this purpose during development of an engine and in the factory but are complex and costly installations, requiring highly skilled operators. Power output evaluation with an engine stand dynamometer is not usually a practical procedure for testing engines at a work installation whether stationary or on a vehicle. Chassis dynamometers, commonly used for checking installed vehicle engines, measure wheel horsepower by applying a controlled braking force to the traction wheels of the immobilized vehicle. Chassis dynamometer measurements also require complex apparatus and the results are of limited accuracy as the critical measurement is not taken at the engine itself but is subject to variables introduced within the vehicle drive train.

While some other forms of power measurement means have been developed for checking engine power performance in a work environment, these have not proved to be fully satisfactory for various reasons such as the need for cumbersome equipment or inherent inaccuracies.

In practice, the lack of an economical and convenient means for checking engine power output in the field has created substantial servicing complications for manufacturers. Virtually any specific engine design is exhaustively evaluated in all respects prior to manufacture to establish, among other parameters, a rated power output at any of various speeds within the operating range. Subsequently, engines coming off the production line are tested and rejected unless performance conforms to the established values within small limits which may typically be plus or minus three percent in the case of rated power output. Once the engine has been installed in a working environment, the user may sometimes empirically come to the conclusion that less than the rated power output is being delivered. Owing to the lack of a convenient means for checking performance in this respect, it has been a common practice to attempt to establish the fact of satisfactory performance by systematically replacing various engine components which might possibly be defective or be malfunctioning. In instances where this inefficient procedure does not produce any obvious increase in power output, the question remains essentially unanswered and may be a source of continuing dissatisfaction to the user of the engine.

Accordingly a need exists for a practical technique and instrumentation for quickly, reliably and economically checking the power output of engines including engines situated in working environments such as a moving vehicle.

SUMMARY OF THE INVENTION

Among the engine characteristics which are customarily measured and published by manufacturers for each specific design and size of engine is a parameter known as Specific Fuel Consumption. This is the ratio of fuel consumption to power output and is customarily expressed in terms of pounds of standardized fuel per brake horsepower per hour. Brake Specific Fuel Consumption, abbreviated BSFC, is essentially an expression of the efficiency of a particular type of engine with respect to converting the latent energy of the fuel into kinetic energy at the engine flywheel.

The present invention makes use of certain characteristics of engines which have not heretofore been recognized as being capable of providing a simple and convenient means for determining power output. In particular, the Specific Fuel Consumption of a particular type of engine at a particular speed is constant at a particular load for that type of engine provided that certain readily detectable malfunctions are absent. We have now recognized that in the absence of such malfunctions, power output at a given speed and a substantially constant load is necessarily a function of fuel flow into the engine combustion chambers and may be computed from a measurement of fuel consumption rate at that speed and load provided that the Specific Fuel Consumption for that engine is known as is the case with virtually all engines. Stated in another way, a particular size and type of standardized engine is known to convert a certain proportion of the latent energy content of a standard fuel into kinetic output energy in the absence of malfunction. Malfunctions which might alter this relationship, such as improper timing, general or localized overheating, abnormally incomplete combustion or the like are readily detectable by standard diagnostic tests. In the absence of these malfunctions, any deviation of power output from the rated value is reliably attributable to a difference in the rate of fuel flow to the combustion chambers relative to the standard engines of that size and type at which the Specific Fuel Consumption was originally measured. Thus the brake horsepower being delivered to the flywheel of a particular engine is computable from a knowledge of the rate of fuel consumption of that engine at a predetermined speed and at a substantially constant load.

Accordingly, the present invention provides for testing the power output of an engine by measuring the fuel flow rate into the engine for a brief period at a known engine speed and substantially constant loading. In a preferred form this is accomplished with a compact instrument which is coupled to an engine through a digitizing tachometer and digitizing fuel flow meter and load variation detector and which utilizes digital circuits to provide a rapid readout of power output.

Accordingly, it is an object of this invention to provide a more convenient, rapid and economical means for checking the power performance of internal combustion engines including engines installed in a working environment.

The invention, together with further objects and advantages thereof, will best be understood by reference to the following description of preferred embodiments taken in conjunction with the accompanying drawings.

DESCRIPTION OF THE PREFERRED EMBODIMENTS

Figure 1:
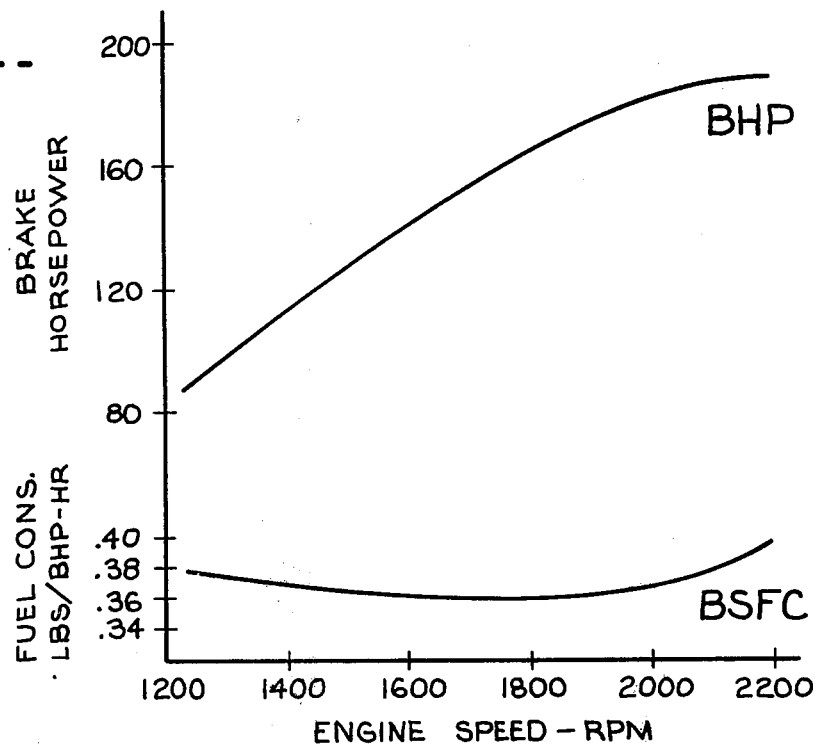
FIG. 1 is a graph showing the brake horsepower output of a typical particular engine design as a function of engine speed and also showing the Brake Specific Fuel Consumption within the same range of engine speeds.

Engines of various designs and sizes differ with respect to the efficiency with which the latent energy of fuel is converted into kinetic energy for driving a load. However, all engines of a particular standardized type exhibit an almost identical efficiency in this respect provided that all components are functioning properly. Virtually all manufacturers measure this efficiency for each type of engine that is produced and sold in volume and the data is made available to the public. This data is generally published in the form of tables or a graph such as FIG. 1 indicating the Specific Fuel Consumption factor at various engine speeds under full rated load, using a standardized fuel. This is effectively a measure of the basic efficiency of the engine as defined above.

Individual engines which deviate from the standardized known performance to any sizeable extent are corrected or rejected by the manufacturer to assure that all engines of that specific type which are sold are initially virtually identical with respect to power performance. Accordingly, any engine of a particular type will produce a known power output at a given speed and load for a given input of standard fuel provided the original efficiency has not been altered by some form of component malfunction. Aside from variations in fuel input, malfunctions which can cause an individual engine to deviate from the standardized power output performance are readily detectable through such symptoms as excess exhaust smoke, overheating, abnormal noise, component failure under prolonged operation, and improper timing. These malfunctions are detectable by certain known standardized diagnost tests.

We have found that in the absence of these readily detectable malfunctions any significant deviation of the power output of a specific working engine from the known standard for that type of engine can be very reliably ascribed to a variation in the rate of fuel flow into the combustion chamber. In the absence of these malfunctions, a known proportion of the latent energy of the fuel must necessarily appear at the engine flywheel as kinetic energy.

It follows from the foregoing that in the absence of malfunctions of the kind discussed above, the brake horsepower output of a particular individual engine at a given speed and substantially constant load is a computable function of fuel input rate provided that the specific fuel consumption factor of the engine is known. The high reliability of this relationship has been demonstrated by repeated tests on a variety of engines using the method of the present invention as checked and verified by conventional horsepower measurements using an engine stand dynamometer.

Accordingly, the present invention provides for a rapid and convenient determination of engine horsepower by measuring fuel flow rate to the combustion chambers of an engine, while monitoring engine speed and constancy of load. Power output may then be determined by multiplying this measured flow rate in terms of amount of fuel consumed in a known time by the Specific Fuel Consumption factor for that type of engine at that engine speed and by multiplying the product by an appropriate units conversion factor to obtain a power value in desired units such as brake horsepower. A further multiplication may be necessary to correct for the fuel used in the test or for differences in fuel temperature and atmospheric pressue if these differ substantially from the standardized fuel and temperature and pressure conditions on the basis of which specific fuel consumption was obtained. Techniques for adjusting the basic Specific Fuel Consumption values to accommodate the differences in fuel energy content, temperature and atmospheric pressure are known to the art as the necessary correction factors are published by engine manufacturers for use in conjunction with conventional dynamometer power measurements. Symbolically:

$$P = S R K_1 K_2$$

where
- $P$ = power output
- $S$ = Specific Fuel Consumption of engine type at test speed and full load
- $R$ = Flow rate in terms of quantity per given time
- $K_1$ = Unit Conversion factor
- $K_2$ = Fuel density correction factor including pressure correction, if appropriate
- ($K_2$ = 1 if standard fuel is employed for test at manufacturers specified temperature and pressure)

The expansion of this generalized equation to utilize specific commonly employed units to obtain power in brake horsepower units will be hereinafter given.

Figure 2:
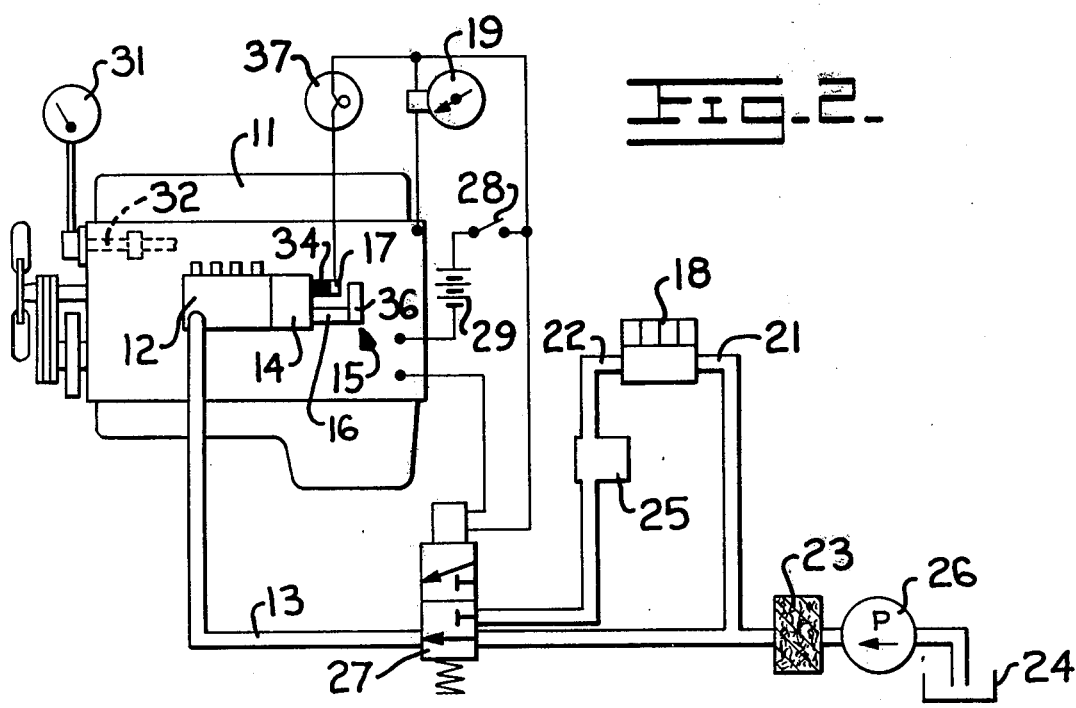
FIG. 2 is a diagram illustrating a method for determining the power output of a given engine.

Referring now to FIG. 2, for purposes of example the method by which power output is tested will be herein described as applied to an engine 11 of the diesel variety having a speed governor, it being apparent that essentially the same procedure may be employed with other forms of internal combustion engine by using appropriately modified test instruments to obtain the necessary data. A diesel engine 11 has a fuel pump 12 which acts to cause injection of fuel into the several cylinders of the engine in a manner well understood within the art. Fuel pump 12 is supplied with fuel through a supply conduit 13 and the rate at which fuel in injected into the engine combustion chambers from pump 12 is in turn determined by the setting of an engine governor 14 in a manner also well understood within the art. To hold the speed of the engine 11 at a preselected value, a governor 14 controls a movable element such as a fuel control rack 16, which shifts to control the rate of fuel flow from pump 12 to the engine to maintain a constant speed under variable loading. At full load for a given speed setting the rack 16 generally contacts a stop 17. The design and operation of a diesel engine 11 including the fuel pump 12 and governor 14 are well understood within the art and accordingly will not be further described herein.

To determine power output in accordance with the invention, it is necessary to determine the rate of flow of fuel to pump 12 during a brief interval in which speed and load remain substantially constant. A volume indicating flow meter 18 and electrically operated clock 19 may be utilized for this purpose. Flow meter 18 may be of any of the known types which accurately indicate the quantity of the fluid which is passed from a meter inlet 21 to a meter outlet 22 and is connected to the engine fuel supply line 13 in a manner which provides for diverting the flow through meter 18 for a selected test period. In particular, supply line 13 usually extends to fuel pump 12 from a fuel filter 23 which receives the fuel from the supply tank 24 through a supply pump 26. Normally, supply line 13 forms a single flow passage directly communicating filter 23 with fuel pump 12. For test purposes, this connection is modified to include a two position solenoid controlled valve 27 which is biased to a normal position at which the fuel flow passage from filter 23 extends directly through the valve 27 to fuel pumps 12 and which has an alternate position, upon being electrically energized, at which this normal flow passage is blocked and the flow is diverted through flow meter 18 before passing through the valve 27 and on to fuel pumps 12.

Certain forms of meter 18 which are most desirable from the standpoint of accuracy tend to be influenced by pressure pulsations caused by fuel pump and other components which may be undesirable insofar as operation of the fuel measuring system is concerned. To remove such pulsations, an accumulator 25 is coupled to conduit 13 between the meter and fuel pump 12. Further, we have found that many such meters which include rotary elements achieve maximum accuracy when readings are taken on the basis of an integral number of full meter revolutions and it is therefore preferable that this practice be followed in the present method. This is easily arranged for in that the amount of fluid transmitted per revolution is a known repeatable factor in the case of most such meters or can readily be measured.

To control the solenoid valve 27 for the purpose of initiating a test, one terminal of the valve solenoid is grounded to engine 11 and the other terminal is connected to the engine through a control switch 28 and power supply 29. In those instances where the engine 11 is installed in a vehicle, the power supply 29 may be the vehicle battery.

To actuate clock 19 concurrently with diversion of the fuel flow through meter 18 one of the clock terminals is grounded to engine 11 while the other terminal also connects with the engine through the control switch 28 and power supply 29. Thus closing of control switch 28 simultaneously diverts the fuel flow to engine 11 through the volume reading meter 18 and activates clock 19 while opening of the switch stops fuel flow through the meter and stops the clock. Accordingly the equipment described above provides a means by which the amount of fuel supplied to the engine 11 in a known time may be precisely determined.

Some engine fuel pumps have a bypass line through which a portion of the received fuel may be returned to tank 24. In such systems accurate fuel consumption readings require that a second meter be placed in the bypass line and that the volume registered by the second meter be subtracted from the volume recorded by meter 18'.

As hereinbefore discussed, two additional steps are taken to determine brake horsepower accurately. First, the fuel consumption rate must be determined while the engine operates at a known substantially constant speed. For this purpose a suitable tachometer 31 is mounted on the engine and coupled to a rotating element thereof such as, for example, the camshaft 32. If, as in the case of many camshafts 32, the rotating element turns at some known angular velocity other than that of the engine flywheel, the tachometer should be appropriately calibrated or interpreted to obtain speed in terms of flywheel revolutions. Attachment of the tachometer 31 for this purpose is not generally difficult as many engines are manufactured with a fitting for emplacing such an instrument.

Another step to be taken during the test is to assure that the engine is operating under a substantially constant load during the test interval. In engines which do not have a governor any load variation is detectable from the resultant change of speed provided that the throttle setting is not changed as the load changes. In governed engines, with the tachometer 31 indicating constant engine speed, variations in loading result in movement of the rack 16 inasmuch as the governor acts in a well known manner to compensate for any such load change to maintain the selected engine speed. Accordingly, an electrically conductive stop element 17 is secured to the governor 14 by an electrically insulative support 34 in position to be contacted by a conductive projection 36 on the rack 16 when the rack is at a predetermined position, normally the position indicative of maximum load for the speed setting inasmuch as the Specific Fuel Consumption of engines is usually originally ascertained at full load. In order for the test data to be referenced to the published Specific Fuel Consumption, it is necessary that the rack 16 or similar fuel metering control be at this predetermined position and remain at such position during the period of the test although momentary departures are tolerable. In order to assure this condition is met, an indicator lamp 37 is connected between conductive stop 17 and the engine 11 through switch 28 and power supply 29. Thus indicator lamp 37 lights when switch 28 is closed provided that the rack projection 36 is contacting stop 17 and thereby grounding the stop. Should loading decrease during the test period this will be made apparent by the fact that indicator lamp 37 goes out inasmuch as the power supply circuit of the lamp is opened by such movement of rack 16. If, as described above, the lamp circuit is closed when the rack 16 is in the full open or rated load position for the speed, an increase in loading during the test period is also readily detectable in that governor 14 cannot compensate for an increased load and thus the engine 11 lugs down which condition is audible and readily evident from the tachometer 31.

Accordingly, to perform a check of the engine power output, the engine 11 is first subjected to the normal diagnostic procedures for detecting any malfunction which might cause the engine to deviate from the standard performance of that class of engine. This includes checking for correct timing, observation of exhaust for excessive smoke, testing for normalcy of coolant temperature and oil temperature and for overheating or failure of specific components under prolonged operation. Provided no such sources of abnormal energy diversion are detected, the several test instruments are installed on the engine as described above.

The engine governor setting is then adjusted to bring engine speed to the desired test value as determined from tachometer 31. If the nature of the engine work installation does not provide any other convenient means for establishing full load, this may be accomplished by performing the test during a brief interval, typically several seconds, while attempting to accelerate the engine by opening the throttle or the like. This is particularly applicable to testing vehicle engines. If the engine is initially operating close to full load, attempted acceleration will not cause sufficient speed change during the brief test interval to seriously affect accuracy of the results. Switch 28 is then closed for a brief period of time, typically for several seconds. During the period switch 28 is closed lamp 37 and tachometer 31 are observed for indications of a significant departure from constant loading and if such a departure is observed, the test is voided by opening switch 28. In that event, clock 19 and flow meter 18 are reset to zero and the test is reinstituted by again closing switch 28. As some very minor variation in loading may be normal, an occasional momentary flicker of lamp 37 may be disregarded unless extreme precision in the power output reading is desired.

Upon opening of switch 28 the volume of fuel supplied to the engine during the test interval is observed from meter 18 and the time between the opening and closing of the switch, which is the test interval, is observed at clock 19. As both volume and time are now known, fuel consumption rate may readily be established in desired units such as pounds per hour by using conversion factors if the meter 18 and clock 19 are not initially calibrated in terms of the desired units. The weight per unit volume of standard fuels at various temperatures is known. The fuel consumption rate may then be multiplied by the known Brake Specific Fuel Consumption for that type of engine at that speed in accordance with the previously given equation to obtain the Brake Horsepower output of the engine 11.

Figure 3:
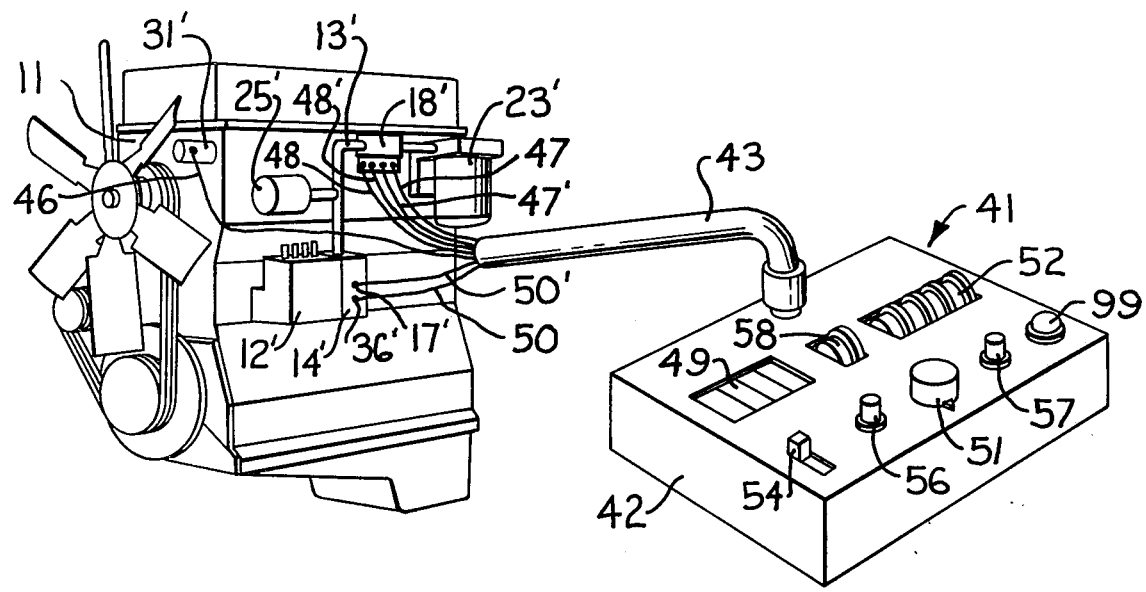
FIG. 3 is a perspective view of a typical engine with an engine performance testing instrument in accordance with the invention shown coupled thereto.

The determination of engine performance by the method described above is a convenient and rapid procedure in that it is only necessary to attach certain compact instruments to the engine, make readings over a very short time period and then perform some simple arithmetic computations. However still greater convenience in the practice of the method may be realized by utilizing a flow meter and tachometer of the form providing digitized signals together with a compact special purpose computer providing digital readout of brake horsepower. FIG. 3 depicts an engine performance checker 41 of this form. Checker 41 includes a console housing 42 containing circuits to be hereafter described and may be coupled to an engine 11' through a multiconductor cable 43. A volume measuring flow meter 18' is connected into the fuel flow conduit 13' from the engine fuel filter 23' to the fuel pump assembly 12' and a tachometer 31' is coupled to a rotating element of the engine 11 as previously described. Flow meter 18' in this instance is of the digitizing form which transmits an electrical pulse each time a predetermined amount of fuel passes through the meter, the pulses being transmitted to checker 41 through paired conductors 47 and 47' of cable 43. Transmitting, digitizing flow meters of this form are known to the art and have been heretofore used with digital circuits to obtain, for example, miles per gallon readings. Tachometer 31' is also of the digitizing type which transmits a predetermined number of electrical pulses for each engine revolution, the pulses being transmitted to checker 41 through another conductor 46 of cable 43. Suitable detailed constructions for a transmitting digitizing tachometer 31' of this form are also known to the art. Contacts 17' and 36' are also mounted on the governor 14' of the engine as previously described and connect with checker 41 through individual conductors 50 and 50', respectively, of cable 43 to provide an engine load signal as obtained from the governor rack. As in the previous instance, an accumulator 25' is coupled to fuel conduit 13' between meter 18' and fuel pump 12' to reduce pressure pulsations which may be introduced by the fuel pumps and valves.

Thus the several instruments which are attached to the engine 11 are essentially similar to those of the previously described embodiment of the invention except insofar as the instruments are of a form producing an electrical signal output rather than a visually readable output.

Mounted at the surface of console housing 42 of checker 41, for purposes to be hereinafter described in more detail, are a neon numerical readout window 49, an engine speed selector knob 51, BSFC factors thumb wheel switch 52, On-off switch 54, meter revolutions selector thumb wheel switch 58, Reset pushbutton switch 56, and Start Calculate pushbutton switch 57, the functions of which will be hereinafter discussed.

Figure 4:
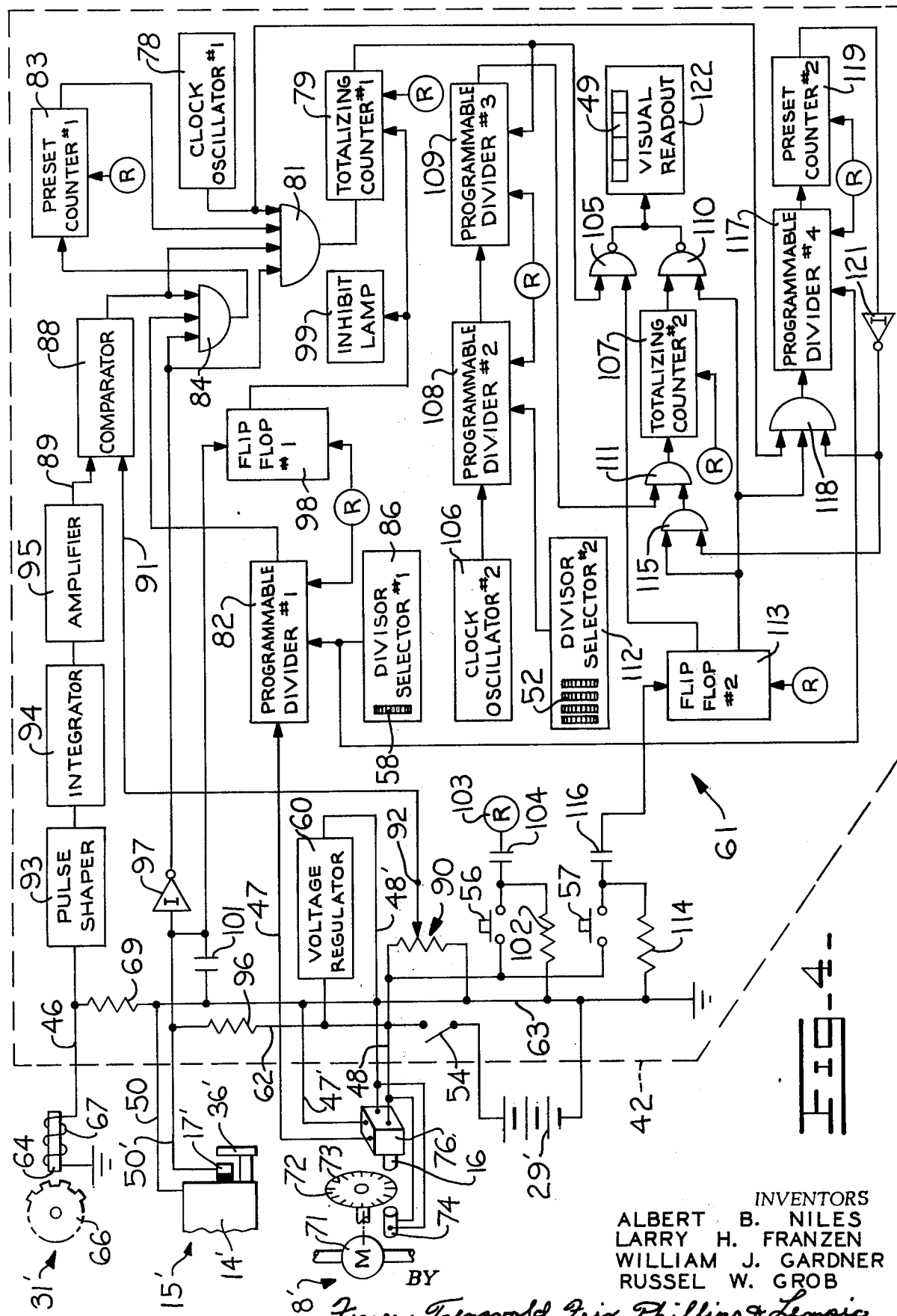
FIG. 4 is a circuit diagram showing component elements of the instrument of FIG. 3 including digital circuitry therein for producing a digital readout of brake horsepower and other performance parameters.

Considering now the electronic and digital circuitry contained within console housing 42 in order to perform the horsepower measurement, reference should be made to FIG. 4. The computation circuit 61 is operated from a battery 29' which may be the vehicle battery if convenient. A B + conductor 62 is coupled to the battery 29' through on-off switch 54 and a ground conductor 63 is coupled to the opposite side of the battery. A regulator 60 is connected across conductors 62 and 63 to assure constant operating voltage.

Considering now the manner in which input data and control signals for the digital portions of the circuit 61 are derived, the digitizing tachometer 31' may be of a known form which includes a permanent magnet core 64 having an end adjacent to a toothed gear wheel 66 formed of ferromagnetic material and which is coupled to the vehicle engine as previously described to rotate with an angular velocity which is a function of the engine speed. A coil 67 is disposed on core 64 and has one end grounded while the other end connects with the RPM signal conductor 46. Within console 42, conductor 46 connects with ground conductor 63 through a load resistor 69. Thus as the teeth of gear 66 sweep past the end of magnet 64 the field of the magnet is cyclically disturbed at a frequency which is proportional to engine speed. This in turn generates a cyclic electrical signal in coil 67 causing an alternating voltage to appear across resistor 69 at a frequency proportional to engine speed.

Fuel meter 18' may consist essentially of a rotary fluid motor 71 connected into the fuel supply line of the engine as previously described and which drives a rotating disk 72 having a series of equiangularly spaced radially directed slots 72. A light surface 74 and photoelectric element 76 are situated on opposite sides of disk 72 whereby an electrical pulse is produced across conductors 47 and 47' each time a slot 73 of the disk passes across the optical axis between light source 74 and photosensitive element 76. Photosensitive element 76 receives operating power through the previously described conductors 48 and 48' which connect to B+ conductor 62 and ground conductor 63 within console 42. Accordingly, each pulse appearing on conductor 47 represents the passage of a predetermined quantity of fuel through motor 71.

A first basic function performed by the computation circuit 61 is to determine the time required for a predetermined quantity of fuel to pass through meter 18' at a preselected engine speed and under substantially constant engine load conditions. For this purpose the output of a first clock oscillator 78, operating at a known fixed frequency which may typically be 1,000 Hz, is transmitted to the input of a first totalizing counter 79 through one input of a four input AND gate 81. Gate 81 is enabled to transmit timing pulses from oscillator 78 to totalizing counter 79 during the period required to pass the predetermined quantity of fuel through meter 18' by signals originating from the meter, rack switch assembly 15' and tachometer 31'. More specifically, signal output conductor 47 of meter 18' is connected to the input of a first programmable divider 82 which has an output connected to a first preset counter 83 through one input of a three input AND gate 84. As previously pointed out, first totalizing counter 79 functions to register the time required for a predetermined quantity of fuel to pass through meter 18'. The function of programmable divider 82 is to enable the operator to select this predetermined quantity of fuel which is to be metered for the purpose of accomplishing the horsepower determination. It has been found that certain forms of fuel meter 18' deliver the most accurate results only if readings are taken on the basis of an integral number of revolutions of the meter elements. Accordingly, the divisor selector circuit 86 which controls programmable divider 82 is manually set by the operator by means of the previously described thumb wheel switch 58 to select an integral divisor for divider 82 which in one example of the invention corresponds to any integral divisor from one to five representing one to five full revolutions of the meter 18'. Thus if thumb wheel 58 is set at a divisor of three, for example, divider 82 transmits one pulse to gate 84 for each three pulses received from the meter 18' and for reasons which will be made clear, this results in the horsepower measurement being made on the basis of three full meter revolutions. In general, most accurate results are obtained where the maximum number of meter revolutions are used but this consideration must be balanced against the additional time required and the fact that the risk of voiding of the results from a variation in engine load during the test period is increased.

Accordingly, provided gate 84 is enabled, preset counter 83 proceeds to count the pulses from programmable divider 82. Preset counter 83 has an output coupled to one of the inputs of gate 81 and is of the form which has an output that changes state, to disable the gate 81, after a predetermined number of counts have been received through gate 84. The number of counts required to cause preset counter 83 to disable gate 81 and thereby stop the time count being made in totalizing counter 79 is equal to the number of output pulses generated by meter 18' in the course of one full revolution of the motor 71. Thus if programmable divider 82 is set to provide a divisor of one, the time count in counter 79 is stopped after one full revolution of the meter 18' and such count is indicative of the time required to pass a predetermined known quantity of fuel through the meter. If the programmable divider 82 is set for a higher divisor, the count registered by counter 79 at the time counter 83 disables gate 81 is indicative of the time required to pass a larger known quantity of fuel through the meter 18' corresponding to a larger number of full meter revolutions.

Time counts are to be recorded by totalizing counter 79 only after the engine is operating at the predetermined selected speed. To assure that this condition is met, another input of both gates 84 and 81 is controlled by the output of a voltage comparator 88 and thus fuel quantity counts can reach preset counter 83 and time pulses can reach totalizing counter 79 only if the output of the comparator delivers an enabling signal to the gates. Comparator 88 is of the form having two inputs 89 and 91 and wherein the output of the comparator transmits the enabling signal only when the voltage on input 89 equals or exceeds the voltage on input 91. To provide a voltage to input 91 of the comparator which determines the engine speed at which the horsepower measurement is to be made, a potentiometer 90 is connected between B+ conductor 62 and ground conductor 63 and has an output 92 coupled to input 91 of the comparator. Potentiometer 90 is of the manually adjustable form and may be set by the operator with control knob 51 of FIG. 3 to provide a predetermined voltage level to the comparator input 91. Referring again to FIG. 4, the other input 89 of the comparator 88 receives a voltage which is determined by the frequency of output pulses from tachometer 31'. Suitable frequency to voltage conversion means for this purpose may be provided by coupling the junction between conductor 46 and resistor 69 to comparator input 89 through a pulse shaper 93, an integrator circuit 94 and amplifier 95. Accordingly, comparator input 89 receives a voltage which is a function of the speed of the engine while comparator input 91 receives a manually selected reference voltage that determines the engine speed at which gates 84 and 81 are enabled to transmit pulses to the associated counters 83 and 79, respectively. To facilitate operation, the potentiometer control knob 51 is preferably calibrated in terms of engine speeds.

The remaining input of both gates 81 and 84 is controlled by a load signal originating at the governor rack switch 15'. In order for the two gates 84 and 81 to be enabled so that the associated counters 83 and 79 begin a count, the rack 36' must contact the stop 17' as occurs when the engine is under full load for the particular selected speed. To control the gates 81 and 84 for this purpose, rack 36' is connected to ground conductor 63 through conductor 50 while stop 17' is connected to B+ conductor 62 through a conductor 50' and a resistor 96. Thus, prior to the time that rack 36' grounds stop 17' a positive voltage is present on conductor 50' and the voltage on conductor 50' drops essentially to ground potential when the rack contacts the stop. The remaining inputs to gates 84 and 81 are connected to conductor 50' through a signal inverter circuit 97 so that the gates are enabled only when the engine is operating at full load for the selected speed. (If the system is used with an ungoverned engine in which load changes necessarily alter the tachometer signal by changing engine speed, a jumper connection may be applied across conductors 50 and 50' to produce a continuous load signal for enabling gates 84 and 81.)

As the horsepower measurement requires a finite interval, typically several seconds, it is possible that a decrease in loading of the engine can occur during the measurement interval and thereby affect the accuracy of the horsepower reading. Such a decrease in load causes the rack 36' to shift out of contact with stop 17'.

Means are provided to void any horsepower reading in the event of such an occurence. In particular, an inhibit flip-flop 98 has set input connected to a governor rack switch conductor 50' whereby the voltage rise on conductor 50' which occurs if the governor rack moves away from stop 17' sets the flip-flop. The output of flip-flop 98 is connected to inhibit lamp 99 and to totalizing counter 79 so that setting of the flip-flop causes a visible void signal to appear on console 42, alerting the operator to the fact that the test should be considered erroneous, and also resets the counter 79 to a count of zero. Some very minor variation in engine loading during the test is normal and it is not desired to void the results if the movement of rack 36' away from stop 17' is very brief and momentary. Accordingly, a filter capacitor 101 is connected between conductor 50' and ground conductor 63. Thus the voltage on conductor 50' does not change abruptly when rack 36' leaves stop 17' and if the two members immediately contact again, flip-flop 98 is not set and gates 81 and 84 are not disabled.

To enable the operator to initiate a horsepower measurement Reset pushbutton switch 56 is connected across B+ conductor 62 and ground conductor 63 in a series with a resistor 102. Thus upon depression of switch 56, a voltage is applied to the ungrounded side of resistor 102. The pulse generated by this application of voltage to the resistor is transmitted by capacitor 104 to the reset input 103 of all counters, dividers and flip-flops in the circuit 61, such inputs being illustrated in FIG. 4 by means of a symbol R at each such element to avoid unnecessary complication in the drawing. Upon depression of switch 56 in this manner, counters 79 and 83 and divider 82 are reset to a count of zero while flip-flop 98 is placed in the reset condition, inactivating inhibit lamp 99, provided that governor rack 36' is grounded against stop 17'. Provided that tachometer 31' indicates an engine speed at least equal to that represented by the setting of potentiometer 90 while the rack switch 15' indicates full load, totalizing counter 79 begins to record a count indicative of the time required for passage of a predetermined amount of fuel through meter 18', which amount is determined by the setting of meter revolutions selector thumb wheel 58. When this predetermined amount of fuel has been metered, the output of preset counter 83 changes state disabling gate 81 and preventing any further counts from being stored in totalizing counter 79. At that time, counter 79 stores a count indicative of the time required for the engine to consume the predetermined known quantity of fuel. This count is displayed visually at a neon numerical readout device 122. For this purpose, this output of counter 79 is connected to the input of readout 122 through a NAND gate 105, and NAND gate being held in an enabled condition during the fuel consumption measurement by means to be hereinafter described.

As previously discussed, the horsepower output of the engine is computable from a knowledge of fuel consumption in a known time inasmuch as the Brake Specific Fuel Consumption factor for the engine is known. Thus the fuel consumption rate count displayed at readout 122 after the above described sequence of operations is proportional to horsepower and could be utilized to determine horsepower by some relatively simple calculations or by reference to a previously prepared conversion table if desired. However, for maximum convenience and accuracy it is desirable that the computations be performed electronically and that horsepower be readout directly. Considering now suitable digital circuit means for this purpose, a second clock oscillator 106 provides output pulses of a predetermined fixed frequency to a second totalizing counter 107 through a second programmable divider 108, a third programmable divider 109 and an AND gate 111. A second divisor selector 112 is coupled to programmable divider 108 to determine the dividing factor therein in accordance with the setting of BSFC factor thumb wheel switch 52. The output of totalizing counter 79 is coupled to programmable divider 109 to set the divisor therein. Specific divisors for a specific system of units will hereinafter be discussed in connection with a description of the arithmetic functions performed in a specific example of the circuit. However, the generalized principle under which the horsepower is computed is that the output frequency oscillator 106 is divided in programmable divider 108 by a factor proportional to the reciprocal of the Brake Specific Fuel Consumption of the engine undergoing testing and is further divided in programmable divider 109 by the time count stored in totalizing counter 79 which is indicative of the time required to consume a known quantity of fuel. As the divisors are reciprocals, the mathematical effect is to accomplish the multiplication of BSFC by rate of fuel consumption as hereinbefore discussed although dividers are used for this purpose. Output pulses from oscillator 106, after being reduced in frequency by the BSFC divisor and by the time count divisor are totaled by counter 107 for a period of time dependent on the quantity of fuel which was passed through meter 18' to conduct the test. The quantity factor is entered into the computation by controlling the time that AND gate 111 is enabled.

To control the gate 111 for this purpose, the second input of the gate is coupled to the output of a second flip-flop 113 through an additional AND gate 115. This holds gate 111 disabled when the flip-flop 113 is in the reset condition and acts to enable the gate 111 when the flip-flop is set provided that gate 115 is also enabled at that time by means to be described. To set flip-flop 113 and thereby initiate the horsepower computation operation, Start Calculate push button 57 is connected between B+ conductor 62 and ground conductor 63 in a series with a resistor 114 and a coupling capacitor 116 is connected between the set input of flip-flop 113 and the junction between switch 57 and resistor 114. Thus upon the operator's depression of switch 57 a voltage rise occurs across resistor 114 causing a set pulse to be transmitted to flip-flop 113 through capacitor 116. This enables gate 111 causing totalizing counter 107 to commence counting pulses from programmable divider 109. An inverted second output of flip-flop 113 enables gate 105 while the flip-flop is reset and changes state when the flip-flop is set to disable gate 105. The output of counter 107 is coupled to the input of readout 122 through a second NAND gate 110 which is enabled by setting of flip-flop 113. Thus, setting of flip-flop 113 decouples readout 122 from counter 79 and couples the readout to counter 107 at the start of the computation phase of operation.

The fuel quantity factor which determines the period that totalizing counter 107 is to continue counting is a function of the number of full revolutions of meter 18' which were employed to obtain the measurement of time required to consume the predetermined quantity of fuel. This number of revolutions was determined by the setting of diviser selector 86. Accordingly, the output of divisor selector 86 is utilized to control the time period during which totalizing counter 107 records counts. For this purpose, the output of the first clock oscillator 78 is transmitted to the input of a fourth programmable divider 117 through a three input AND gate 118. Gate 118 has a second input which receives an enabling signal from flip-flop 113 when the flip-flop is set. The divisor of programmable divider 117 is determined by a connection to divisor selector 86 so that the clock pulses from oscillator 78 are divided by an integral number equal to the number of meter revolutions which were employed in the fuel consumption measurement. The output of programmable divider 117 is transmitted to the input of a second preset counter 119 which totalizes the time counts from oscillator 78 as reduced by the meter revolutions divisor factor set into programmable divider 117. Preset counter 119 is of the form having an output that changes state after a predetermined number of time counts have been received. In this example, counter 119 changes state after 1,000 counts have been received. The output of the preset counter 119 is coupled to the second input of gate 115 and the third input of AND gate 118 through an inverter 121. Accordingly, when preset counter 119 changes state after receiving a predetermined number of counts, gate 115 is disabled and in turn disables gate 111 to totalizing counter 107 stopping the count therein. Gate 118 is similarly disabled to stop the time count in counter 119. The count stored in counter 107 at that time indicates the power output of the engine and appears at the windows 49 of the visual readout device 122 which is coupled to counter 107 through NAND gate 110. To provide for a subsequent power measurement, dividers 108, 109 and 117 and counters 107 and 119 are each coupled to the reset signal source 103 to be reset upon depression of the Reset push button switch 56.

Understanding of the operation of the circuit 61 may be further clarified by considering the specific arithmetic values employed in one example of the circuit operating on the basis of a particular system of units. In this example of the invention, the meter 18′ is of the type which completes one revolution for each 0.0066809 gallon of fuel passed through the meter and which generates 720 pulses on conductor 47 for each meter revolution. The function of the first totalizing counter 79 and associated elements of the circuit is to record the time to the nearest 0.001 second which the engine under test requires to consume this particular volume of standard fuel. For this purpose, first clock oscillator 78 operates at a frequency of 1000 Hz and first preset counter 83 is set to change state and stop the count being recorded in totalizing counter 79 after 720 input pulses are received from the first programmable divider 82. The programmable divider 82 selectively provides a divisor in the signal path between meter 18′ and preset counter 83 which in this example may be any of the integral numbers from 1 to 5. If the selected divisor is 1, the programmable divider 82 is essentially a through signal path for the 720 pulses from meter 18′ representing one full meter revolution and when present counter 83 changes state after the 720 pulses from the meter, to stop the count in totalizing counter 79, the count which is then stored in the totalizing counter is a measurement in seconds of the time required for the engine to consume the above stated quantity of fuel. If the programmable divider 82 is set for some other integer the count stored in totalizing counter 79 is some integral multiple of the above stated time.

Thus the count which is stored in totalizing counter 79 and temporarily displayed at readout 122 is the time required for the engine to consume 0.0066809 gallons of fuel multiplied by the number of meter revolutions which were selected for test purposes.

To convert this stored fuel consumption time to a brake horsepower reading, the portion of circuit 61 between second clock oscillator 106 and readout 122 is activated by manual depression of the Start Calculate switch 57 after readout 122 displays a fixed number indicating that the fuel consumption measurement has been completed. The circuit then solves the following specific equation:

$$\frac{.0066809 \text{ GAL}}{1 \text{ METER}_{REV}} \times \underbrace{\frac{6.985 \text{ LBS OF FUEL}}{\text{GAL}}}_{(bsfc \text{ term})} \times \frac{3600 \text{ SEC}}{\text{HR}} \times \quad (a)$$

$$\frac{BHP \text{ HR}}{\text{NO. OF LBS } (.XXX) \text{ FUEL}} \times$$

$$\frac{\text{NO. OF METER } REV \, (M_R) \text{ IN TEST}}{\text{DURATION OF TEST IN } (t.ttt) \text{ SEC}} = BHP$$

All of the terms have units which cancel out to provide for rewriting of the equation as follows:

$$\frac{.0066809}{1} \times \frac{6.985}{1} \times \frac{3600}{1} \times \underbrace{\frac{1}{(.XXX)}}_{(bsfc \text{ term})} \times \frac{M_R}{(t.ttt)} = BHP \quad (b)$$

$$167.988 \times \underbrace{\frac{1}{(.XXX)}}_{(bsfc \text{ term})} \times \underbrace{\frac{1}{(t.ttt)}}_{(\text{duration of test in seconds term})} = \frac{BHP}{M_R} \quad (c)$$

To rid the second and third terms of three place decimals, the equation may be changed as shown below:

$$167.988 \times 10^5 \times \frac{1}{(.XXX) \, 10^3} \times \frac{1}{(t.ttt) \, 10^3} = \frac{BHP}{M_R \times 10^1} \quad (d)$$

Changing the second and third terms to indicate division results in:

$$16.7988 \times 10^6 \div \underbrace{(XXX)}_{(bsfc \text{ term})} \div \underbrace{(tttt)}_{\substack{(\text{duration of test} \\ \text{in seconds term})}} = \frac{BHP}{M_R \times 10^1} \quad (e)$$

Accordingly, using this system of units, second clock oscillator 106 is designed to operate at a frequency of 16.7988 MHz. The BSFC term is set into programmable divider 108 as a whole number since it has been rid of its decimal by the multiplication step shown above. The duration of test in seconds term was automatically programmed into programmable divider 109 by the totalizing counter 79 at the end of the fuel rate measurement. A new frequency has thus been derived which when counted by totalizing counter 107 for a period equal to 1 second × (No. of Meter Rev. in Test) × $10^1$ equals BHP.

Using the partially reduced equation (b) and assuming a bsfc of 1/0.453, and 2 for the No. of Meter Rev. in Test term, and 1/3.965 for the term describing Duration of Test in Seconds, horsepower is found to be:

$$\frac{.0066809}{1} \times \frac{6.985}{1} \times \frac{3600}{1} \times \frac{1}{.453} \times \frac{2}{3.965} = BHP$$

or:

$$167.988 \times \frac{1}{.453} \times \frac{2}{3.965} = BHP$$

or:

$$\frac{167.988 \times 2}{.453 \times 3.967} = \frac{335.996}{1.796145} = 187.065 \; BHP$$

Figure 5:
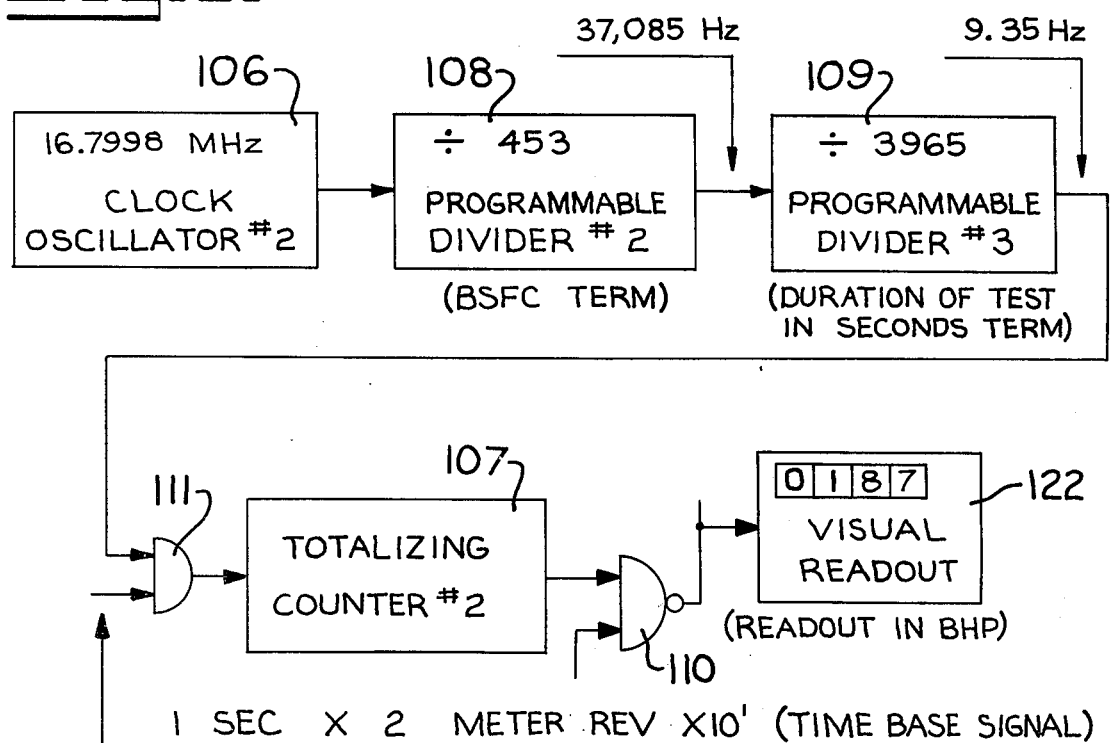
FIG. 5 is a block diagram showing specific mathematical values for certain components of the circuit of FIG. 4 in a specific example of the invention.

FIG. 5 illustrates these specific values for one example placed into the appropriate boxes in the horsepower computation portion of FIG. 4.

The above example of specific values for certain operations is adapted to the system of units for power, Brake Specific Fuel Consumption, quantity, time and the like which is customarily employed in the United States of America. It will be apparent that essentially the same apparatus may be adapted to read engine power in any other system of units by making appropriate changes in arithmetic parameters.

While the invention has been described with respect to certain preferred embodiments, it will be apparent that many variations are possible with the scope of the invention and it is not intended to limit the invention except as defined in the following claims.

What is claimed is:

1. In a method of determining the power output of an internal combustion engine which is of a type having a known Specific Fuel Consumption rating at a predetermined speed, the steps comprising measuring the rate of fuel consumption at said engine while operating said engine substantially at said predetermined speed, maintaining said speed of said engine and the load thereon substantially constant while measuring said fuel consumption rate thereof to assure validity of said power output determination, and multiplying said measured fuel consumption rate by said known Specific Fuel Consumption rating to determine power output of said engine, wherein said fuel consumption rate measurement is made with timing means in conjunction with a volume measuring flow meter of the form having rotatable fluid metering means, and including the further steps of determining fuel consumption rate by determining the time required for passage of a predetermined amount of fuel through said meter wherein said predetermined amount of fuel is equal to the amount of fuel which said meter transmits in an integral number of revolutions of said rotatable means, and damping fluid pressure pulsations in the fuel flow passage between said engine and said meter.

2. Apparatus for determining the power output of an engine wherein said engine has a known specific fuel consumption value at said particular speed which specific fuel consumption value is a ratio of quantity of fuel consumed per unit power output in a unit time, and wherein power output at a particular speed has a predeterminable mathematical relationship to said specific fuel consumption value and the rate of fuel consumption at said speed, comprising:

means for measuring the rate of fuel consumption of said engine while operating substantially at said speed and for producing an output signal indicative of said rate of fuel consumption, said means for measuring the rate of fuel consumption of said engine including a rotary fluid flow meter coupled to a fuel supply conduit of said engine, computation means coupled to said fuel consumption rate measuring means and receiving said output signal therefrom and having means for entering said specific fuel consumption value for computing said power output of said engine in accordance with said mathematical relationship, and accumulator means communicated with said fuel supply conduit for dampening pressure pulsations in the fuel flow therethrough.

* * * * *